United States Patent [19]

Shimura et al.

[11] Patent Number: 5,095,307

[45] Date of Patent: Mar. 10, 1992

[54] RADIO PAGING COMMUNICATION SYSTEM

[75] Inventors: Kazuhiro Shimura, Mizuho; Kenji Iwahara, Oome, both of Japan

[73] Assignee: Casio Computer Co., Ltd., Tokyo, Japan

[21] Appl. No.: 645,354

[22] Filed: Jan. 24, 1991

[30] Foreign Application Priority Data

May 17, 1988 [JP] Japan .................. 63-120030
Aug. 31, 1988 [JP] Japan .................. 63-215267

[51] Int. Cl.5 .............. G08B 5/22; H04M 11/00
[52] U.S. Cl. .................. 340/825.44; 340/825.69; 379/57
[58] Field of Search ............. 379/57; 455/38; 340/825.44, 825.48, 825.69

[56] References Cited

U.S. PATENT DOCUMENTS

| | | |
|---|---|---|
| 4,336,524 | 6/1982 | Levine . |
| 4,438,433 | 3/1984 | Smoot et al. . |
| 4,639,225 | 1/1987 | Washizuka . |
| 4,754,473 | 6/1988 | Edwards .................. 379/57 |
| 4,766,434 | 8/1988 | Matai et al. ................ 455/38 |
| 4,806,906 | 2/1989 | Oda et al. ................ 340/311.1 |
| 4,811,379 | 3/1989 | Grandfield .................. 379/57 |
| 4,814,763 | 3/1989 | Nelson et al. .............. 340/825.44 |
| 4,823,362 | 4/1989 | Etoh ...................... 375/116 |
| 4,837,858 | 6/1989 | Ablay et al. ................ 455/34 |
| 4,878,051 | 10/1989 | Andros et al. ................ 379/57 |

Primary Examiner—Jin F. Ng
Assistant Examiner—Jhancy Augustus
Attorney, Agent, or Firm—Frishauf, Holtz, Goodman & Woodward

[57] ABSTRACT

In a radio paging communication system, an exclusive input device such as a personal computer capable of inputting alpha-numeric code data and a normal key telephone are included for inputting message data to an alpha-numeric paging receiver. The alpha-numeric paging receiver includes a circuit for detecting a specific code in the message data. In order to input message data from the key telephone set, the specific code is input prior to input of the message data. The paging receiver displays data following the specific code as numeric code data.

13 Claims, 14 Drawing Sheets

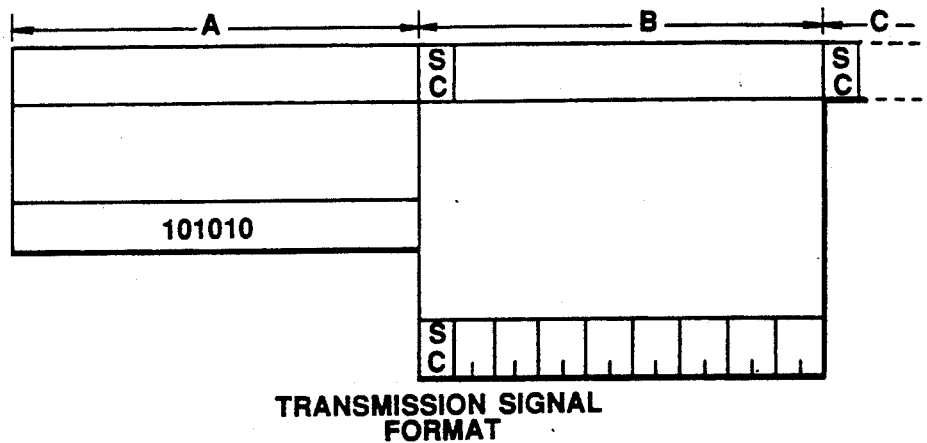
TRANSMISSION SIGNAL FORMAT
FIG. 2A
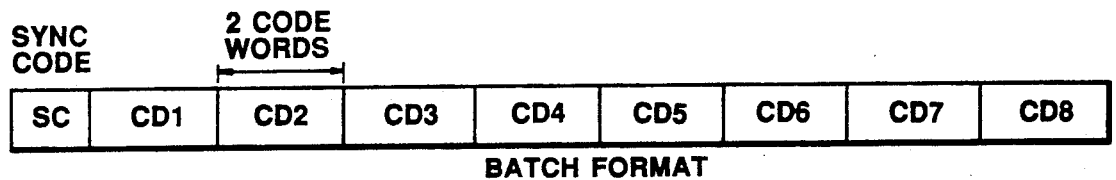
BATCH FORMAT
FIG. 2B
| MESSAGE FLAG | ADDRESS BIT | FUNCTION BIT | BCH PARITY | EVEN PARITY |
|---|---|---|---|---|
| 1 | 2 TO 19 | 20/21 | 22 to 31 | 32 |
ADDRESS CODE WORD
FIG. 2C
| MESSAGE FLAG | MESSAGE BIT | BCH PARITY | EVEN PARITY |
|---|---|---|---|
| 1 | 2 TO 21 | 22 to 31 | 32 |
MESSAGE CODE WORD
FIG. 2D

JIS 8-BIT CODE

| COLUMN ROW | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | NUL | TC7(DLE) | (SP)(3) | 0 | @ | P | ` | p | | | NOT DEFINED | ― | ﾀ | ﾐ | | |
| 1 | TC1(SOH) | DC1 | ! | 1 | A | Q | a | q | | | ｡ | ｱ | ﾁ | ﾑ | | |
| 2 | TC2(STX) | DC2 | " | 2 | B | R | b | r | | | ｢ | ｲ | ﾂ | ﾒ | | |
| 3 | TC3(ETX) | DC3 | # | 3 | C | S | c | s | | | ｣ | ｳ | ﾃ | ﾓ | | |
| 4 | TC4(EOT) | DC4 | $ | 4 | D | T | d | t | | | ､ | ｴ | ﾄ | ﾔ | | |
| 5 | TC5(ENQ) | TC8(NAK) | % | 5 | E | U | e | u | | | ･ | ｵ | ﾅ | ﾕ | | |
| 6 | TC6(ACK) | TC9(SYN) | & | 6 | F | V | f | v | | | ｦ | ｶ | ﾆ | ﾖ | | |
| 7 | BEL | TC10(ETB) | ' | 7 | G | W | g | w | | | ｧ | ｷ | ﾇ | ﾗ | | |
| 8 | FE0(BS) | CAN | ( | 8 | H | X | h | x | | | ｨ | ｸ | ﾈ | ﾘ | | |
| 9 | FE1(HT) | EM | ) | 9 | I | Y | i | y | | | ｩ | ｹ | ﾉ | ﾙ | | |
| A | FE2(LF) | SUB | * | : | J | Z | j | z | | | ｪ | ｺ | ﾊ | ﾚ | | |
| B | FE3(VT) | ESC | + | ; | K | [ | k | { | | | ｫ | ｻ | ﾋ | ﾛ | | |
| C | FE4(FF) | IS4(FS) | , | < | L | \ | l | \| | | | ｬ | ｼ | ﾌ | ﾜ | | |
| D | FE5(CR) | IS3(GS) | - | = | M | ] | m | } | | | ｭ | ｽ | ﾍ | ﾝ | | |
| E | SO | IS2(RS) | . | > | N | ^ | n | ~ | | | ｮ | ｾ | ﾎ | ﾞ | | |
| F | SI | IS1(US) | / | ? | O | _ | o | DEL | | | ｯ | ｿ | ﾏ | ﾟ | | NOT DEFINED |

Columns 8, 9 and E, F: NOT DEFINED

FIG. 3

| ABBREVIATION NO. | STANDARD EXPRESSION |
|---|---|
| 01 | PLEASE RETURN UNTIL |
| 02 | WE MADE CONTACT CUSTOMER. |
| 03 | TOTAL AMOUNT IS ¥ |
| 04 | PLEASE CALL AT |
| ⋮ | |

FIG. 6

| CODE | CHARACTER | KEY TELEPHONE OPERATION |
|---|---|---|
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | 9 | 9 |
| A | END | # |
| B |  | *9 |
| C | SPACE | *1 |
| D | − | *2 |
| E | ⊐ | *3 |
| F | ⊏ | *4 |

FIG. 7

STANDARD EXPRESSION TRANSMISSION

EXAMPLE1

KEY OPERATION: *4*401–8*200#

TRANSMISSION CODE: FF01–8D00A

DISPLAY: PLEASE RETURN UNTIL 18:00

EXAMPLE2

KEY OPERATION: *4*402*4*4032000#

TRANSMISSION CODE: FF02FF032000A

DISPLAY: WE MADE CONTACT WITH CUSTOMER. TOTAL AMOUNT IS ¥2,000.

FIG.11

RADIO PAGING COMMUNICATION SYSTEM

This application is a continuation of application Ser. No. 07/352,098, filed May 15, 1989 now abandoned.

BACKGROUND OF THE INVENTION

1. Field of the Invention

The present invention relates to a radio paging communication system having an alpha-numeric display paging receiver.

2. Description of the Related Art

A numeric display paging receiver and an alpha-numeric display paging receiver are available as receivers capable of receiving message data from a caller and displaying the message data in conventional radio paging communication systems. A most convenient data input means for transmitting message data to a paging receiver is a key telephone set.

Although the key telephone set is used as an input means for inputting message data to a numeric display paging receiver in a conventional radio paging communication system, the key telephone set is not used as an input device for inputting message data to an alpha-numeric display paging receiver due to the following reason. Message data is not input to the alpha-numeric display paging receiver without using an exclusive data input terminal such as a personal computer. The alpha-numeric display paging receiver has an advantage in that perfectly free letter information can be received, while the numeric display paging receiver can receive only numeric information as message data. However, the alpha-numeric display paging receiver is not yet popular in spite of the above advantage.

At the time of transmission of message data to the alpha-numeric display paging receiver in the conventional radio paging communication system, even if message contents represent numeric information such as a destination telephone number, the message data is coded as an alpha-numeric code. Therefore, transmission efficiency of the message data is undesirably degraded.

SUMMARY OF THE INVENTION

It is an object of the present invention to provide a radio paging communication system capable of transmitting message data from a normal key telephone set to an alpha-numeric display paging receiver.

It is another object of the present invention to provide a method of effectively transmitting message data consisting of or including numeric information to the alpha-numeric display paging receiver.

It is still another object of the present invention to provide an improved alpha-numeric display paging receiver.

In order to achieve the above objects of the present invention, there is provided a radio paging communication system comprising an incoming telephone line, a base station, and alpha-numeric display paging receivers, said base station including means for receiving the message data next to a calling number of a given alpha-numeric paging receiver from said incoming telephone line, means for detecting the message data received by said receiving means to be a specific code, signal processing means for normally forming the message data received by said receiving means as alpha-numeric code data and for forming data following a specific code as numeric code data when the specific code is detected, thereby forming a paging signal code, and a transmitter for transmitting the paging signal code formed by said signal processing means as a radio signal, and each of said alpha-numeric display paging receivers including means for receiving the radio signal transmitted from said transmitter and demodulating the radio signal, means for detecting whether the specific code is included in the demodulated message data, and display means for displaying the demodulated message data as the alpha-numeric code data until the specific code is detected by said detecting means and for displaying data following the specific code as the numeric code data after the specific code is detected by said detecting means.

BRIEF DESCRIPTION OF THE DRAWINGS

FIGS. 2A to 2D are formats of a radio paging signal code;

FIG. 3 is a table showing a JIS (Japanese Industrial Standards) 8-bit code set;

FIG. 6 is a table showing abbreviation Nos. and contents of the corresponding standard expressions;

FIG. 7 is a table showing codes corresponding to the key operations of abbreviation Nos. and characters;

FIG. 11 is a view showing examples of transmission of standard expression abbreviation Nos.;

DETAILED DESCRIPTION OF THE PREFERRED EMBODIMENTS

Figure 1:
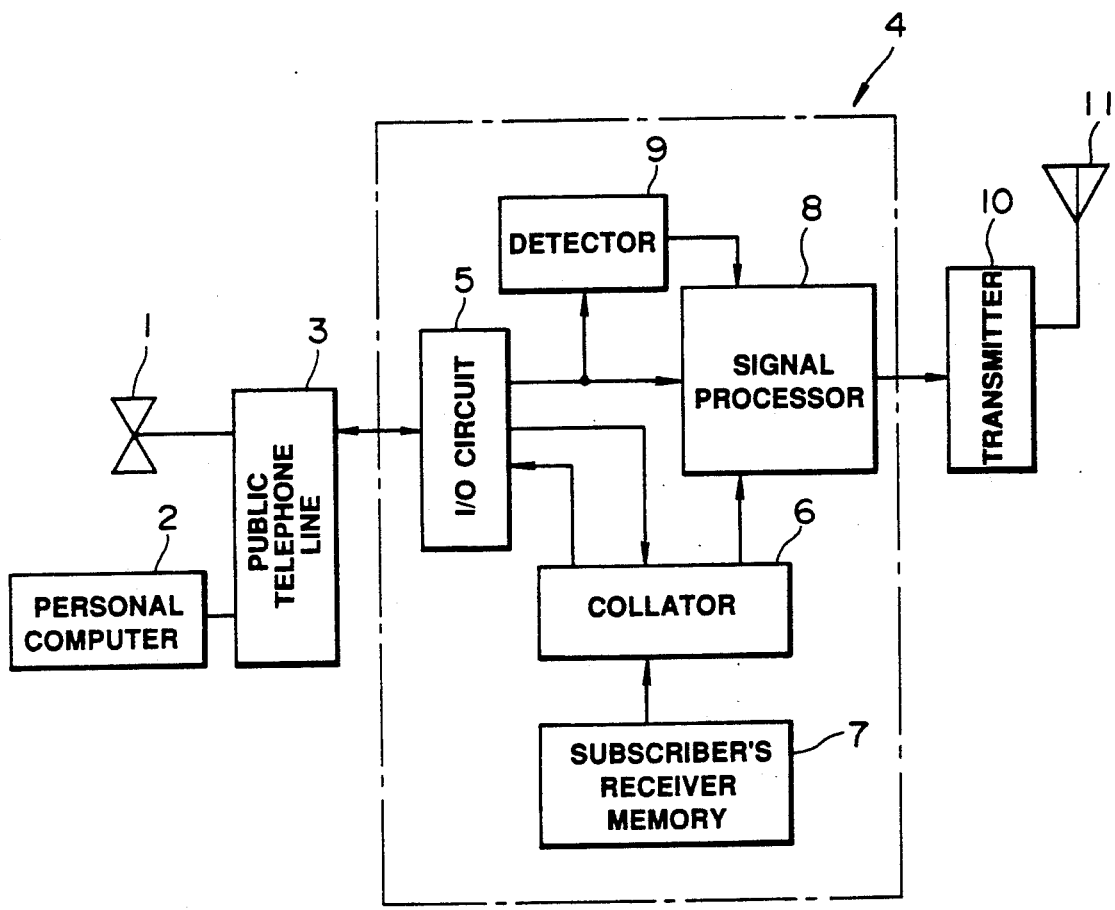
FIG. 1 is a block diagram showing a system configuration of a base station in a radio paging communication system.

FIG. 1 is a block diagram showing a system configuration of a base station in a radio paging communication system. Referring to FIG. 1, reference numeral 1 denotes a key telephone set; and 2, a personal computer having a communication function. The key telephone set 1 and the personal computer 2 are used as input terminals for causing a caller to input a calling number of a paging receiver and a message thereto. The key telephone set 1 and the personal computer 2 are connected to a control center 4 of the base station through public telephone line 3.

The control center 4 includes an I/O circuit 5 connected to the public telephone line 3. The I/O circuit 5 includes a modem and an answering circuit. A calling number input by the caller at the key telephone set 1 or the personal computer 2 is input to a collator 6 through the public telephone line 3 and the I/O circuit 5. The collator 6 collates the input calling number with calling numbers of a plurality of subscriber's receivers which are stored in a subscriber's receiver memory 7. When the input calling number does not coincide with any one of the calling numbers stored in the memory 7, the collator 6 sends a command to the answering circuit in the I/O circuit 5 to cause the answering circuit to send to the caller a message "The designated calling number is not registered at present". However, when the input calling number coincides with one of the calling numbers stored in the memory 7, the collator 6 sends the input calling number which coincides with one of the stored calling numbers to a signal processor 8. At the same time, the collator 6 outputs one of the different commands based on different types of paging receivers in accordance with the destination paging receiver assigned with this calling number. The selected command is output to the I/O circuit 5 and the signal processor 8. When the type of paging receiver assigned with the input calling number coinciding with the stored calling number is a tone-only type having no display device, the collator 6 sends a command to cause the I/O circuit 5 to send a message "Calling is started. Please hang up the phone and wait" to the caller. The collator 6 sends a command to cause the signal processor 8 to send a paging signal. When the type of pager receiver is a numeric display type having a seven segments type display device, the collator 6 sends a command to the I/O circuit 5 to cause it to send a message "Please input a message." to the caller. In this case, the collator 6 sends a command to the signal processor 8 to cause it to treat the message data input from the caller as a numeric code, i.e., 4-bit coded data. When the type of paging receiver is an alpha-numeric display type having a matrix type display device, the collator 6 sends a command to the I/O circuit 5 to cause it to send a message "Please input a message." to the caller. In this case, the collator 6 sends a command to the signal processor 8 to cause it to treat the message data input from the caller as an alpha-numeric code, e.g., JIS (Japanese Industrial Standards) 8-bit coded data.

The message data from the caller is input to the signal processor 8 and a detector 9 through the I/O circuit 5. The detector 9 detects a shift code which represents that the subsequent data in the message data is numeric code data when the shift code is included in the message data. The shift code can be constructed by device control codes DC1 to DC3 in alpha-numeric codes (e.g., an ISO 7-bit code, an ASCII code which complies with the ISO 7-bit code, a JIS 7-bit code, or a JIS 8-bit code), or nondefined codes in these alpha-numeric codes. When the shift code is used as a code which represents that the subsequent numeric data represents a standard abbreviation No., it must be a combination of continuous numeric codes which will not be found in a normal data input, as will be described later. When the detector 9 detects that the shift code is included in the message data from the caller, the detector 9 sends a command to the signal processor 8 to cause it to treat message data subsequently input to the signal processor 8 as the alpha-numerically coded data. The signal processor 8 processes the paging receiver calling number supplied from the collator 6 and the caller's message data input through the public telephone line 3 and the I/O circuit 5 into a paging signal code having a predetermined format.

A radio paging signal code to be used in the paging communication system of this embodiment will be described below.

FIGS. 2A to 2D are code formats of the CCIR (Commite Consuitatif International des Radio-Communication) radiopaging code No. 1 which is a so-called POCSAG (Post Office Code Standardization Advisory Group) code.

FIG. 2A shows an overall transmission signal format The format including a 576-bits preamble signal L- A of "101010 . . . " and a plurality of subsequent batch data B, C, . . . The preamble signal causes the paging receiver to recognize that the data will be transmitted. At the same time, the preamble signal establishes bit synchronization.

FIG. 2B shows a batch data format. The batch data format includes a one-word sync code SC at its beginning. Eight frames CD1 to CD8 each having two codewords follow the sync code SC. Each codeword has 32 bits. The codewords are classified into address and message codewords.

FIGS. 2C and 2D show formats of address and message codewords, respectively. FIG. 2C shows the address codeword which includes a message flag at its beginning. An address bits (address code), function bits, BCH parity bits, and an even parity bit follow the message flag.

The message flag indicates whether the codeword is an address or message codeword. If the message flag is set at logic "0", it represents an address codeword. If the message flag is set at logic "1", it represents a message codeword. The address code follows the message flag and consists of bit 2 to bit 19. The address code corresponds to the calling number. Function bits follow the address code. The function bits have two bits and represent, for example, a display form and an alarm form. The function bits represent four functions by "00", "01", "10", and "11". The function information can be input by the caller at the key telephone set upon a paging contact between a subscriber and a paging service company. Therefore, the function information can be used to identify the caller. The BCH parity bits are used to correct an error in the address code and have bit 22 to bit 31. The even parity bit follows the BCH parity bits. The even parity bit represents an odd or even number of "1"s from the beginning to the end of the address codeword.

Twenty message bits follow a message flag of the message codeword shown in FIG. 2D. The message bits represent message data from a caller. If 4-bit coded numeric data are used, the message data represent five characters. However, if the 8-bit coded alpha-numeric data are used, the message data represent 2.5 characters. The data bits are arranged such that the least significant bit (LSB) is output first every character. That is, if the first character is a character of the numeric data, the LSB of the character is located at bit 2 of the message codeword, and the most significant bit (MSB) thereof is located at bit 5. The LSB of an alpha-numeric data character is located at bit 2 of the message codeword, and the MSB is located at bit 9. BCH parity bits and an even parity bit are added to the message bits in the same manner as in the address codeword.

The signal processor 8 shown in FIG. 1 generates an address codeword corresponding to the calling number from the collator 6 and a message codeword corresponding to the caller's message data on the basis of the commands from the collator 6 and the detector 9, and sends them as a paging signal code having a predetermined format to a transmitter 10. In this case, the address codeword is inserted in any one of the frames of the batch format (FIG. 2B) on the basis of the calling number. The message codeword is transmitted next to the address codeword. If the message data from the caller cannot be assigned to one message codeword, a plurality of message codewords are generated and are continuously transmitted next to the address codeword. The transmitter 10 transmits the paging signal code from the signal processor 8 as a radio signal from an antenna 11.

In this embodiment, the normal data code of the message data for the alpha-numeric display paging receiver may be a JIS 8-bit code (FIG. 3). A code "FF" (hexadecimal notation) which is not defined in the JIS 8-bit code table is used as a shift code. Therefore, when message data including the shift code "FF" is input as the message data from the caller to the alpha-numeric display paging receiver, the base station outputs the data up to the shift code "FF" as the 8-bit code data and the subsequent code as the 4-bit code data. The alpha-numeric display paging receiver which receives this data processes the reception data as the 8-bit code data if it does not detect the shift code "FF" in the received message data. Otherwise, the alpha-numeric display paging receiver processes the subsequent data as 4-bit code data.

A paging receiver which is employed in the radio paging communication system according to a first embodiment will be described with reference to FIGS. 4 to 11. In this embodiment, the paging receiver includes a standard expression memory.

Figure 4:
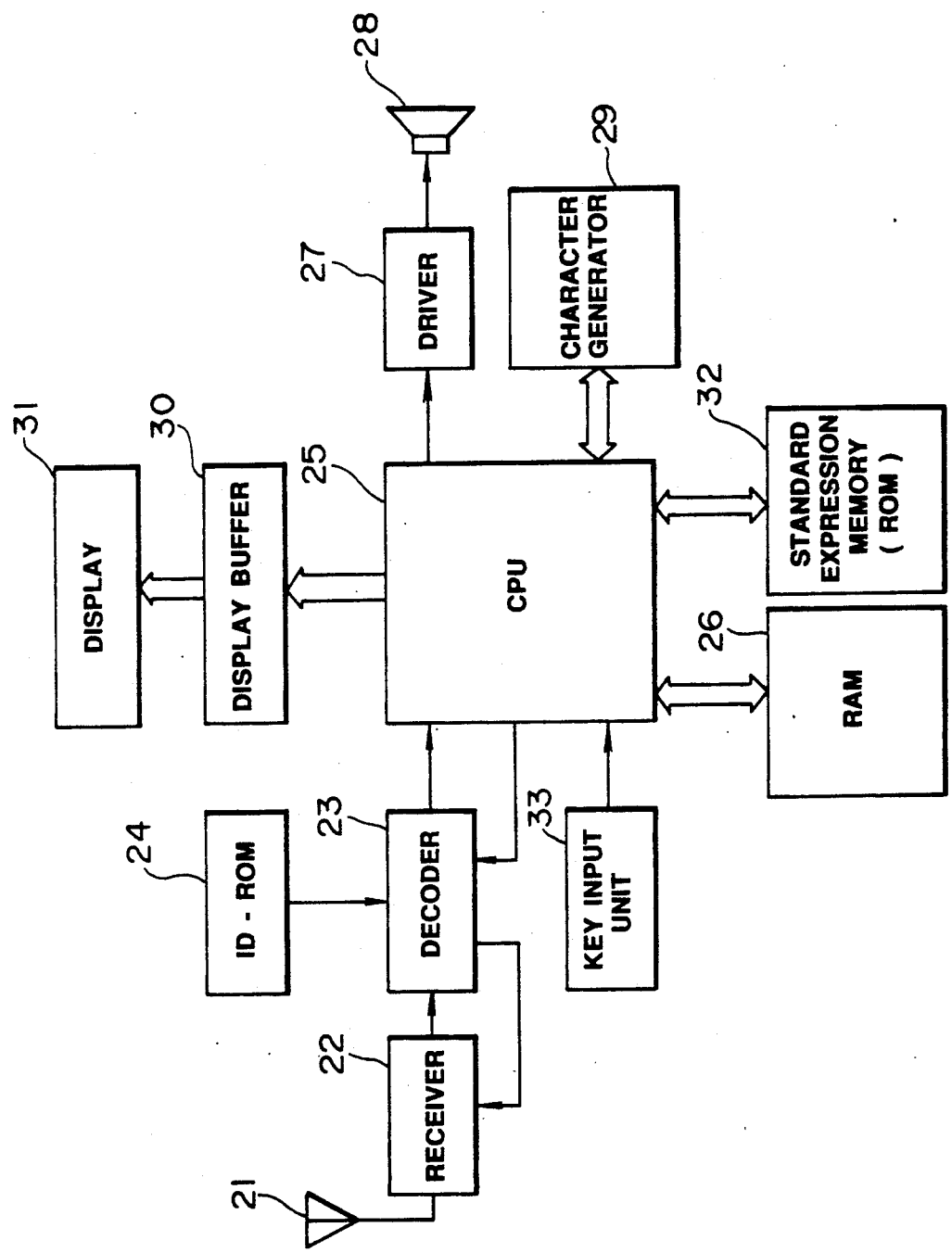
FIG. 4 is a block diagram showing a circuit arrangement of a paging receiver used in the radio paging communication system according to a first embodiment of the present invention.

Referring to FIG. 4, reference numeral 21 denotes an antenna for receiving the radio signal transmitted from the base station antenna 11 shown in FIG. 1. The radio signal received by the antenna 21 is demodulated into a digital signal by a receiver 22. The digital signal is supplied to a decoder 23. The decoder 23 compares the input calling number (address code) with its own calling number stored in an ID-ROM 24 to determine whether the input calling number coincides with its own calling number. If a noncoincidence is detected, the reception operation of the receiver 22 is stopped. However, if a coincidence is detected, the message data to be received is supplied to a CPU 25.

The CPU 25 sequentially stores the reception data from the decoder 23 in a RAM 26 and causes a loudspeaker 28 to generate an alarm sound through a driver 27. When message data stored in the RAM 26 is to be displayed, the CPU 25 determines whether the shift code "FF" for converting a reading unit from eight bits to four bits is present in the data. If no shift code "FF" is detected, the CPU 25 determines that the data is character data of the normal 8-bit code, and pattern data corresponding to the character data are read out from a character generator 29. The readout pattern data are transferred to a display buffer 30. The received message is then displayed on a display 31 such as an LCD (Liquid Crystal Display).

When the shift code "FF" is present in the readout data, the CPU 25 determines that the data is 4-bit code data. The two hexadecimal numbers (i.e., two four-bit data) following the shift code "FF" are processed as a standard expression abbreviation numbers. That is, a standard expression character code corresponding to the two four-bit data (i.e., two hexadecimal numbers) is read out from a standard expression memory 32. The pattern data corresponding to this character code is transferred to the display buffer 30, and the standard expression message is displayed on the display 31.

Reference numeral 33 denotes a key input unit which includes a readout switch (not shown) for reading out a received message stored in the RAM 26 and a reset switch for stopping an alarm sound and a display. Key input signals from the key input unit 33 are output to the CPU 25.

Figure 5:
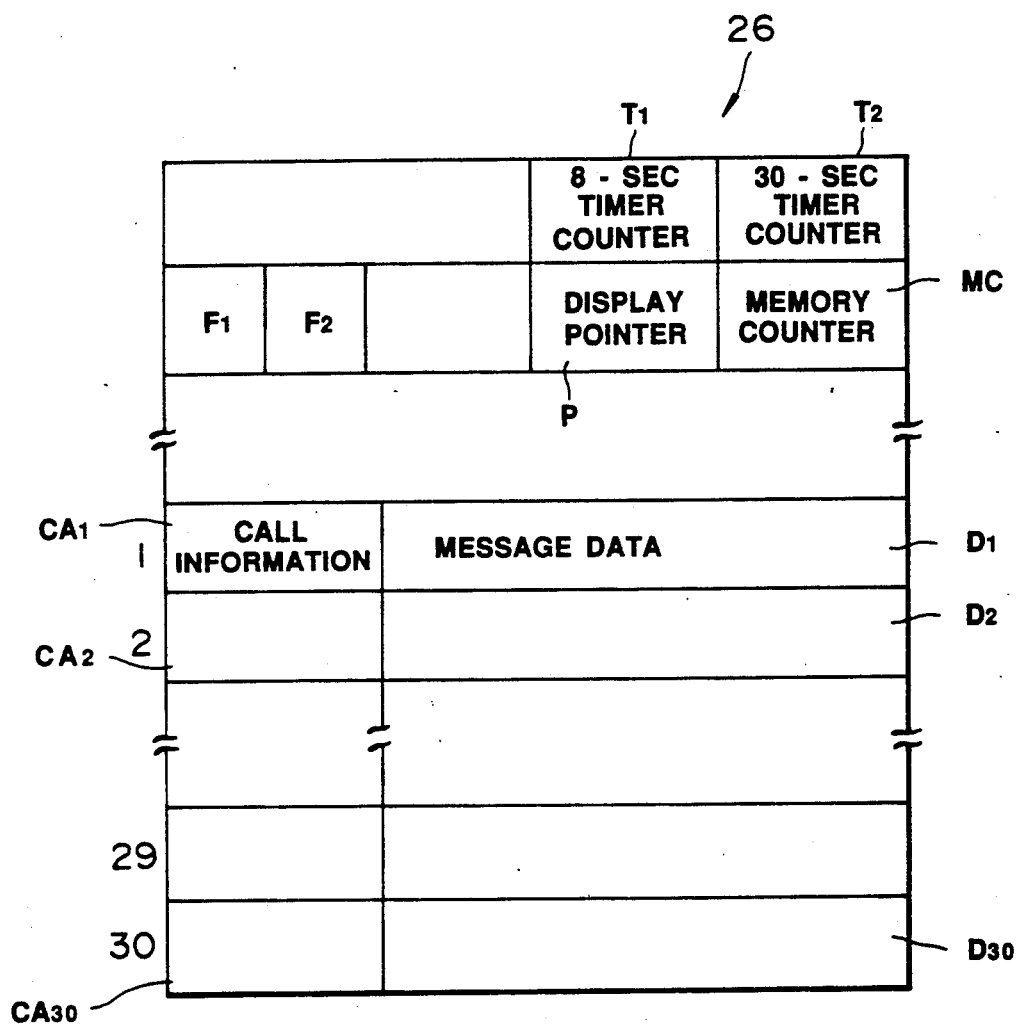
FIG. 5 shows a data format of data stored in a RAM shown in FIG. 4.

FIG. 5 shows a data format of the RAM 26. As shown in FIG. 5, the RAM 26 includes 30 message registers $D_1$, pieces of call information are respectively stored in registers $CA_1, CA_2, \ldots, CA_{30}$.

The call information is the function information as previously mentioned. When a plurality of calling numbers are assigned to a single receiver, information representing a correspondence between calling and a specific one of the calling number can be also included in the call information. At the time of calling, different alarm sound, e.g., different melodies are generated based on different pieces of call information, and they are stored in the registers $CA_1$ to $CA_{30}$.

These pieces of call information are simultaneously displayed during the display of the received message (to be described later). Even after the alarm sound is stopped, the callee can confirm who is calling, i.e., he knows a correspondence between calling and a specific one of the calling numbers, and the content of the function information by monitoring the call information. An 8-sec timer counter $T_1$ is a timer for counting an alarm time of the alarm sound. A 30-sec timer counter $T_2$ is a timer for counting a 30-sec display period. A display mode flag $F_1$ is a flag for determining whether the message data is being displayed. During the display, the flag $F_1$ is set at logic "1". An alarming flag $F_2$ determines whether the alarm sound is being produced. During generation of the alarm sound, the alarming flag $F_2$ is set at logic "1". The RAM 26 also includes a display pointer P which represents an address of message register storing the message data to be displayed, and a memory counter MC for storing the number of messages stored in the message registers $D_1$ to $D_{30}$.

FIG. 6 is a table showing the standard expression abbreviation Nos. and the contents of the standard expressions corresponding to the abbreviation Nos. When an abbreviation No., i.e., two hexadecimal digits, for example, "01" or "02", is sent to the base station, the abbreviation No. is transmitted from the base station to the receiver. The corresponding standard expression as shown in FIG. 6 is displayed on the receiver.

FIG. 7 shows hexadecimal numbers and characters which correspond to key input operations when the numeric keys "0" to "9", a key "#", and a key "*" of the key telephone set are combined to represent the hexadecimal numbers "0" to "F". As described above, when the nondefined code "FF" (hexadecimal notation) in the JIS 8-bit code table is defined as the shift code for shifting the reading unit from the JIS 8-bit code to a 4-bit code, the keys "*" and "4" are sequentially is used twice, thereby inputting the shift code "FF". A desired standard expression abbreviation number is then input. A code "EE" is also not defined in the JIS 8-bit code table. In addition, since a character "]" corresponding to the 4-bit code "E" is not successively input in a normal state, the code "EE" may be used as a shift code.

An operation of the receiver having the above arrangement will be described with reference to flow charts in FIGS. 8 to 10.

Figure 8:
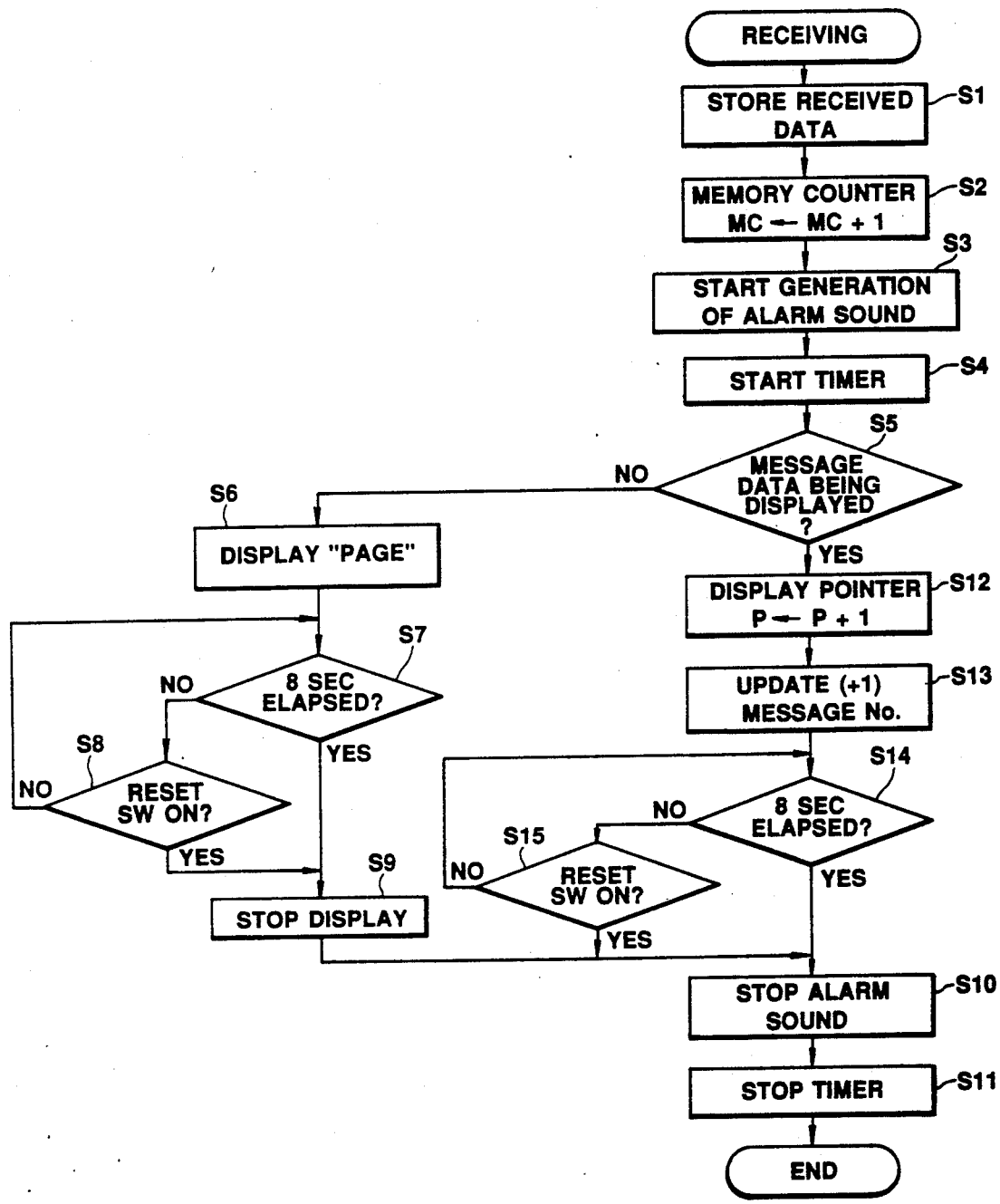
FIG. 8 is a flow chart showing receiving processing.

FIG. 8 is the flow chart showing receiving processing when calling is made. When the receiver receives a radio signal from the base station and detects its own calling number, message data received next to the calling number is stored in the first register $D_1$ of the message registers of the RAM 26 in step $S_1$. In this case, prior to storage of the received data in the register $D_1$, the previous message data stored in the RAM 26 are sequentially shifted to the subsequent registers. Therefore, the currently received message data is stored in the first register $D_1$, and the second newest message data is stored in the second register $D_2$. In this manner, the messages data are stored in the registers in accordance with the reception time order. In step $S_2$, the count value of memory counter MC is incremented by "1". When the message data are stored in all the registers $D_1$ to $D_{30}$, this increment processing is not performed. The alarming flag $F_2$ is set to start generation of an alarm sound (step S3). At the same time, the timer counter $T_1$ for counting the 8-sec alarm time is cleared and then started (step S4).

When alarming is started, the CPU 25 determines whether the display mode flag $F_1$ is set, i.e., the message data is being displayed (step $S_5$). If the display flag $F_1$ is set at logic "0", the flow advances to step S6 to display a message "Page is made." In step S7, the CPU 25 determines whether 8 seconds have elapsed. If NO in step S7, the flow advances to step S8 to determine whether the reset switch is turned on. If NO in step S8, the flow returns to step S7. The operations in steps S7 and S8 are repeated to produce the alarm sound for 8 seconds.

However, if YES in step S8, i.e., the CPU 25 determines that the reset switch is operated, or if YES in step S7, i.e., the CPU 25 determines that 8 seconds have elapsed, the flow advances to step S9 to stop the display. In addition, the alarm sound is stopped, and the alarming flag $F_2$ is reset (step S10). The operation of the timer counter $T_1$ is also stopped (step S11).

When the CPU 25 determines in step S5 that the display mode flag $F_1$ is set at logic "1", i.e., the user is called while the message data stored in the RAM is displayed, the flow advances to step S12. The display pointer P which represents a memory address of the displayed message is incremented by one.

The display pointer P is incremented due to the following reason. The currently received data is stored in the first message register $D_1$ upon reception the incoming call, and the previous data is shifted by one address. At the same time, the message No. (address) stored in the display buffer is incremented by one, so that the message No. is updated to a new No. (step S13). Thereafter, the CPU 25 determines whether eight seconds have elapsed in the same manner as in step S7 (step S14) and whether the reset switch is turned on in the same manner as in step S8 (step S15). The flow then advances to steps S10 and S11 to stop alarming and the timer counter $T_1$.

In step S6, the message "page" is displayed. Instead of this, the message indicated by the received message data may be displayed. In this case, the processing in step S6 is same as the read out data processing described in later with reference to FIG. 10.

Figure 9:
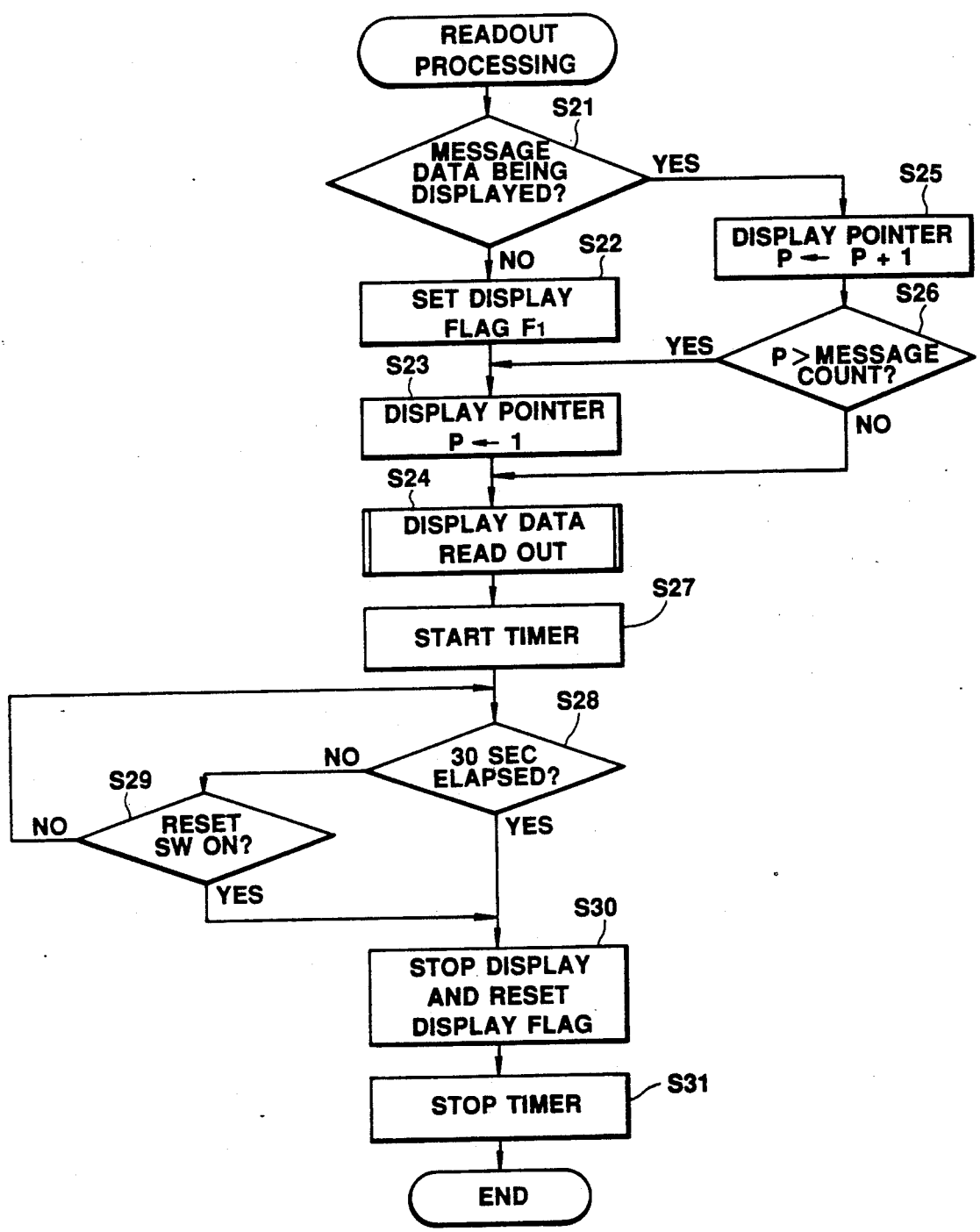
FIG. 9 is a flow chart showing readout processing.

When a data readout switch is depressed instead of calling, readout processing shown in FIG. 9 is executed. In readout processing, the CPU 25 determines in step S21 whether the display mode flag $F_1$ is set at logic "1", i.e., the message data is displayed. If the display mode flag $F_1$ is reset at logic "0", the switching operation is the first readout operation, and the flag $F_1$ is set at logic "1" (step S22). The display pointer P is set at logic "1" (step S23). data processing in step S24 is executed.

When the display mode flag $F_1$ is set at logic "1" in step S21, this state is obtained upon depression of the readout switch again during data readout. In this case, the flow advances to step S25, and the display pointer P is incremented by "1", thus updating the pointer. The CPU 25 determines in step S26 whether the value of the display pointer P is larger than the count value of the memory counter MC, i.e., the number of stored messages. If NO in step S26, i.e., if P≦MC, the readout data processing in step S24 is executed. However, if YES in step S26, i.e., if P>MC, the flow advances to step S23. In step S23, the display pointer P is set at 1, and the address of the pointer returns to the beginning.

The contents of the readout data processing in step S24 will be described in detail with reference to the flow chart in FIG. 10.

Figure 10:
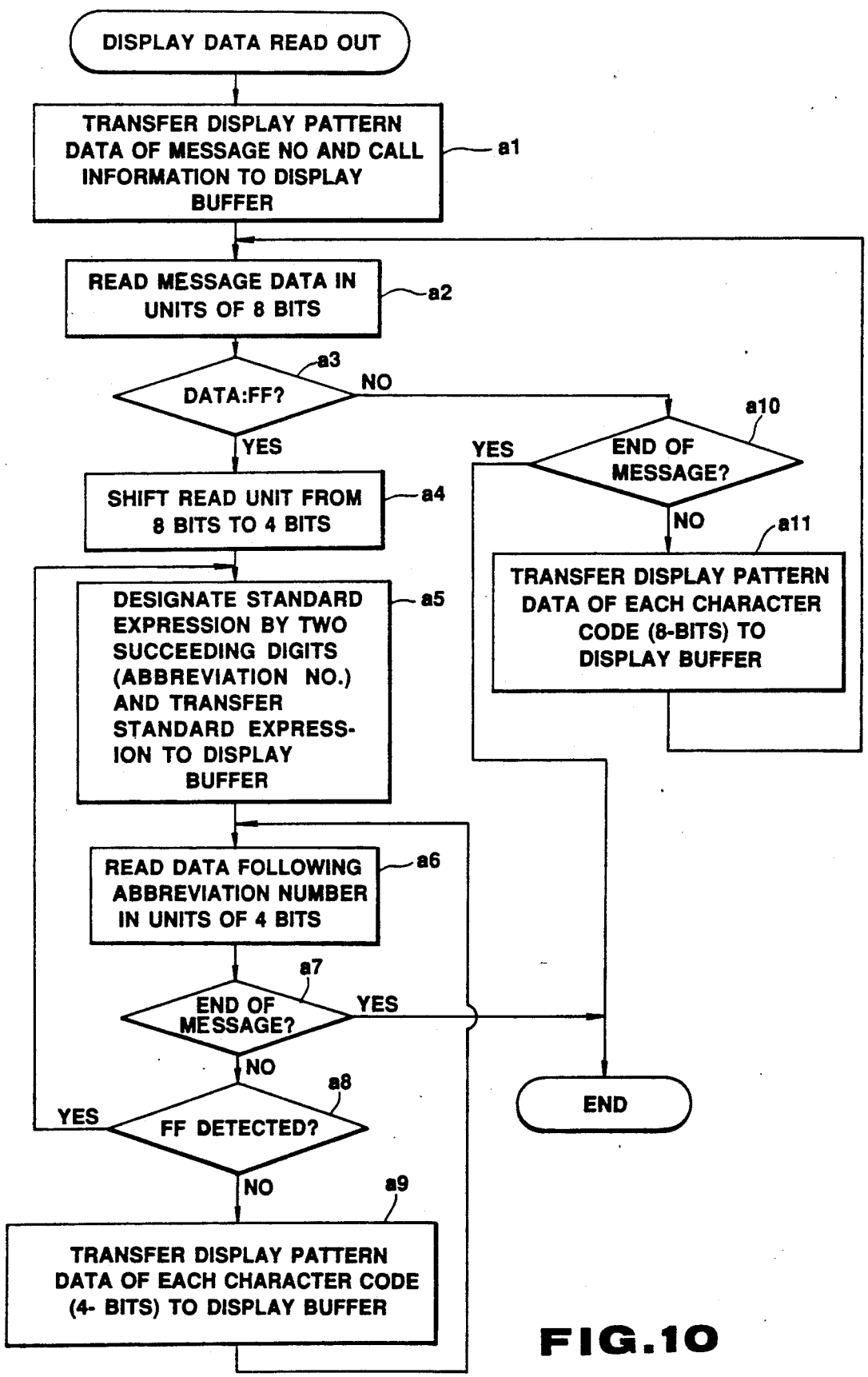
FIG. 10 is a flow chart showing readout data display processing (FIG. 9) in detail.

In step a1 of FIG. 10, the call information of the message register designated by the display pointer P is read out, and the display pattern data corresponding to these codes together with the message No. are read out from the character generator 29 and stored in the display buffer 30. The message data is read as alpha-numeric code data in units of eight bits (step a2). The 8-bit data is determined to be the shift code "FF" representing shifting of the reading unit from eight bits to four bits (step a3). If the 8-bit data is determined to be the shift code "FF", the subsequent analysis or reading unit is shifted into 4 bits (step a4). The two hexadecimal digits following the shift code "FF" are recognized as an abbreviation No. of the standard expression message, and the character code corresponding to the abbreviation No. is read out from the standard expression memory 33. The character pattern data corresponding to the character code are read out from the character generator 29 and are transferred to the display buffer 30 (step a5). The data following the abbreviation No. are read in units of four bits (i.e., each hexadecimal digit) (step a6). The CPU 25 then determines in step a7 whether the message is ended. If NO in step a7, the flow advances to step a8 to determine whether two four-bit code data "F" successively appear. If YES in step a8, the flow returns to step a5, and the two hexadecimal digits are processed as a standard expression abbreviation number.

If NO in step a8, i.e., if two code data "F" are not successively detected, the pattern data corresponding to 4-bit code data analyzed first are read out from the character generator 29 in step a9. The readout pattern data are transferred to the display buffer 30, and the flow returns to step a6. When the end of message is determined in step a7, the pattern data corresponding to the immediately preceding analyzed 4-bit code data is read out from the character generator 29 and transferred to the display buffer 30. Thereafter, the processing is ended.

However, if the shift code "FF" is not determined in step a3, the flow advances to step a10 to determine whether the message is ended. If NO in step a10, the flow advances to step a11, and the data are analyzed as 8-bit codes. The pattern data corresponding to these codes are read out from the character generator 29 and transferred to the display buffer 30. Thereafter, the flow returns to step a2.

FIG. 11 shows key operations, a transmission code transmitted from the base station and display contents when standard expression abbreviation number are input as 4-bit code data from the key telephone set.

As shown in FIG. 11, in order to input the standard expression corresponding to the abbreviation No. "01" at the key telephone set, after a calling number of a receiver is input, the keys "*" and "4" are subsequently depressed, and this combination is depressed twice to input the shift code "FF". Numbers "0" and "1" as the standard expression abbreviation No. "01" are input. Subsequently, the numeral keys "1" and "8", the keys "*" and "2" corresponding to a hyphen "—", the numeral keys "0" and "0", and the end key "#" are depressed. In the base station, the shift code "FF" as the first input data is detected by the detector 9 in FIG. 1. The base station processes the subsequent input data as the 4-bit codes. The base station sends out the shift code "FF" for shifting the reading unit to four bits from eight bits, the abbreviation number "01", numerals "1" and "8", the hyphen "D" (hexadecimal notation), and numerals "0" and "0".

The receiver stores the transmitted data in the message registers $D_1$ to $D_{30}$. When the receiver detects the hexadecimal code "FF", the analysis or reading unit is changed from the 8-bit code to the 4-bit code. Data "01" following the shift code "FF" is decoded as the standard expression abbreviation number, and the subsequen data are decoded as 4-bit codes. In Example 1, the standard expression corresponding to the abbreviation number "01" and data are displayed on the display 30 as "Please return before 18:00."

Example 2 shows operations, a transmission code and display contents when the shift code "FF" is transmitted twice to display two different standard expressions. Abbreviated numbers "02" and "03" are sent after the respective shift codes "FF", thereby transmitting two different standard expressions As a result, a message "We made contact with customer Total amount is 2,000." is displayed on the display 31.

When readout data display processing is completed, the flow advances to step S27 in FIG. 9. The 30-sec timer counter $T_2$ is started. The CPU 25 determines in step S28 whether 30 seconds have elapsed. If NO in step S28, the CPU 25 determines in step 29 whether the reset switch is operated. When the reset switch is operated or 30 seconds have elapsed, the display is stopped, and the display mode flag $F_1$ is reset to logic "0" (step S30). The timer counter $T_2$ is stopped (step S31), and the processing is ended.

When an abbreviation number and a numeric code are transmitted from the base station, these data are coded as 4-bit codes, and the 4-bit codes are transmitted together with the shift code, thereby effectively transmitting the data. In the receiver, the shift code is detected, and the transmitted data are processed as 4-bit codes. The received message can be displayed without complicating the circuit arrangement and the processing procedures.

A paging receiver according to another embodiment of the present invention will be described with reference to FIGS. 12 to 14. In this embodiment, a standard expression memory is detachable from the paging receiver. The same reference numerals as in the first embodiment denote the same parts in the second embodiment, and a detailed description thereof will be omitted.

Figure 12:
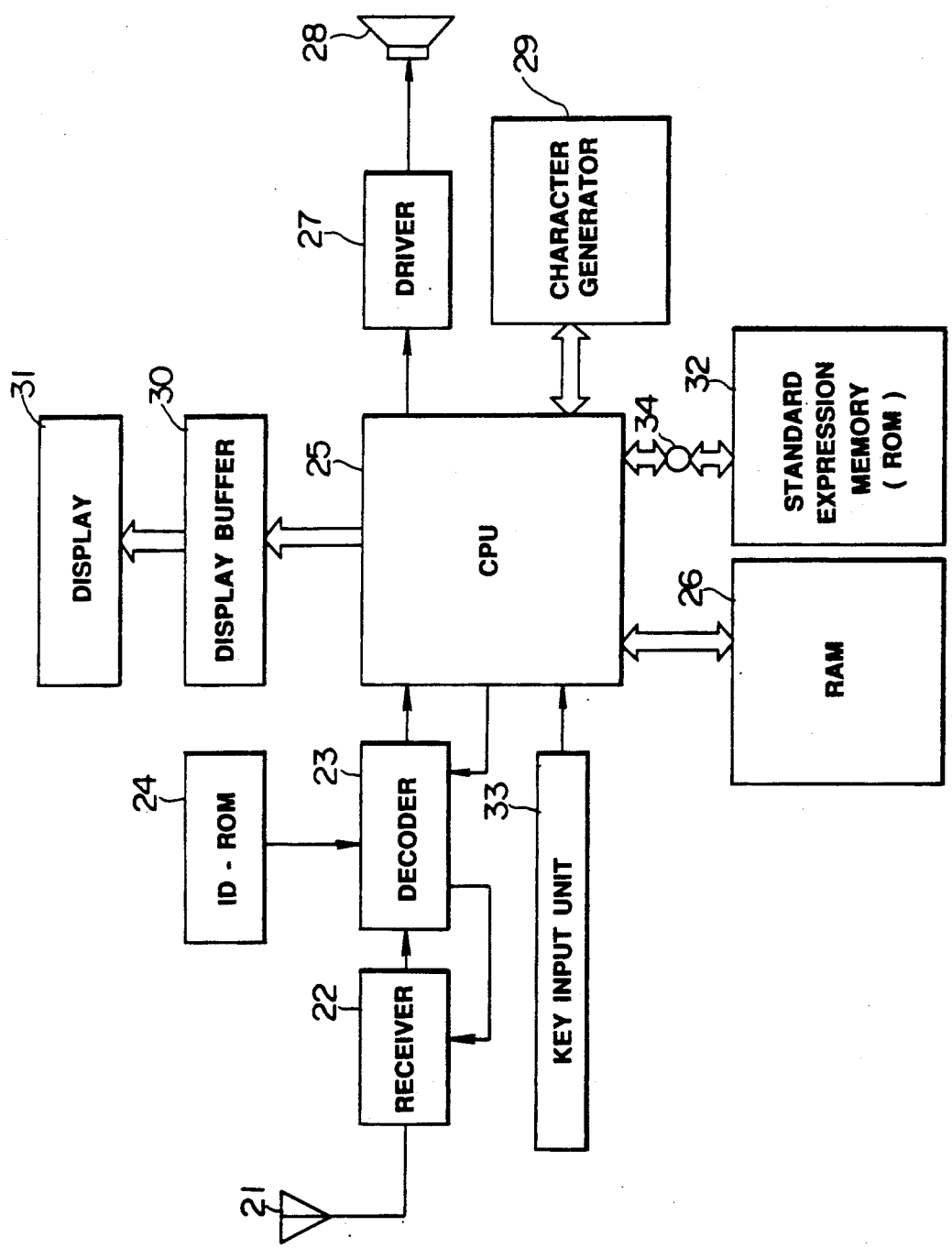
FIG. 12 is a block diagram showing a circuit arrangement of a paging receiver according to a second embodiment of the present invention.

FIG. 12 is a block diagram showing a circuit arrangement of the receiver. As is apparent from FIG. 12, the receiver of the second embodiment is substantially the same as that of the first embodiment (FIG. 4) except that a standard expression memory 32 is connected to a CPU 25 through a connector 34.

Figure 13:
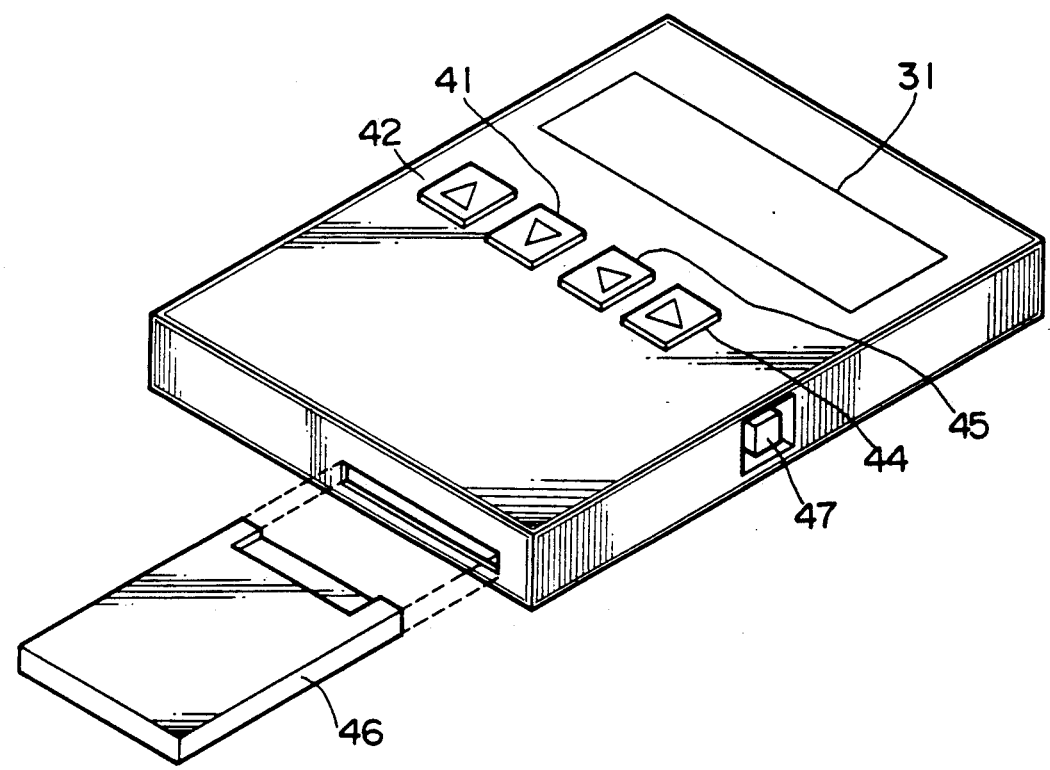
FIG. 13 is a perspective view of the paging receiver and its detachable standard expression memory.

FIG. 13 is a perspective view of the receiver. A display 31 for displaying a received message stored in a RAM 26, a forward key 41, which corresponds to the data readout switch in the first embodiment, for incrementing a read address of the RAM 26, a reverse key 42 for decrementing the read address, a right key 44 for displaying a message part immediately following the currently displayed message part if the received message is too long to be displayed at once, and a left key 45 for displaying a message part immediately preceding the currently displayed message part of the excessively long message are arranged on the upper surface of the receiver. A standard expression memory pack 46 which incorporates a standard expression memory 32 (to be described later) is detachable at the rear end surface of the receiver An eject switch 47 is arranged on the right side surface of the receiver Upon operation of the eject switch 47, the standard expression memory pack 46 can be ejected from the receiver When a caller sends a standard abbreviation No. as a message in the radio paging communication system having this paging receiver, a code "00" for representing that the subsequent data is an ID number of a standard expression memory 32 and a 4-bit numeric code for designating the ID number are transmitted as part of the message data in order to specify the abbreviation No. of a given standard expression memory.

An operation of the receiver will be described below. Receiving processing upon reception of an incoming call is the same as that of the receiver of the first embodiment described with reference to FIG. 8. Readout processing upon operation of the forward key 41 is the same as that of the first embodiment described with reference to FIG. 9 except for readout data display processing. Therefore, only the readout data display processing will be described below.

Figure 14:
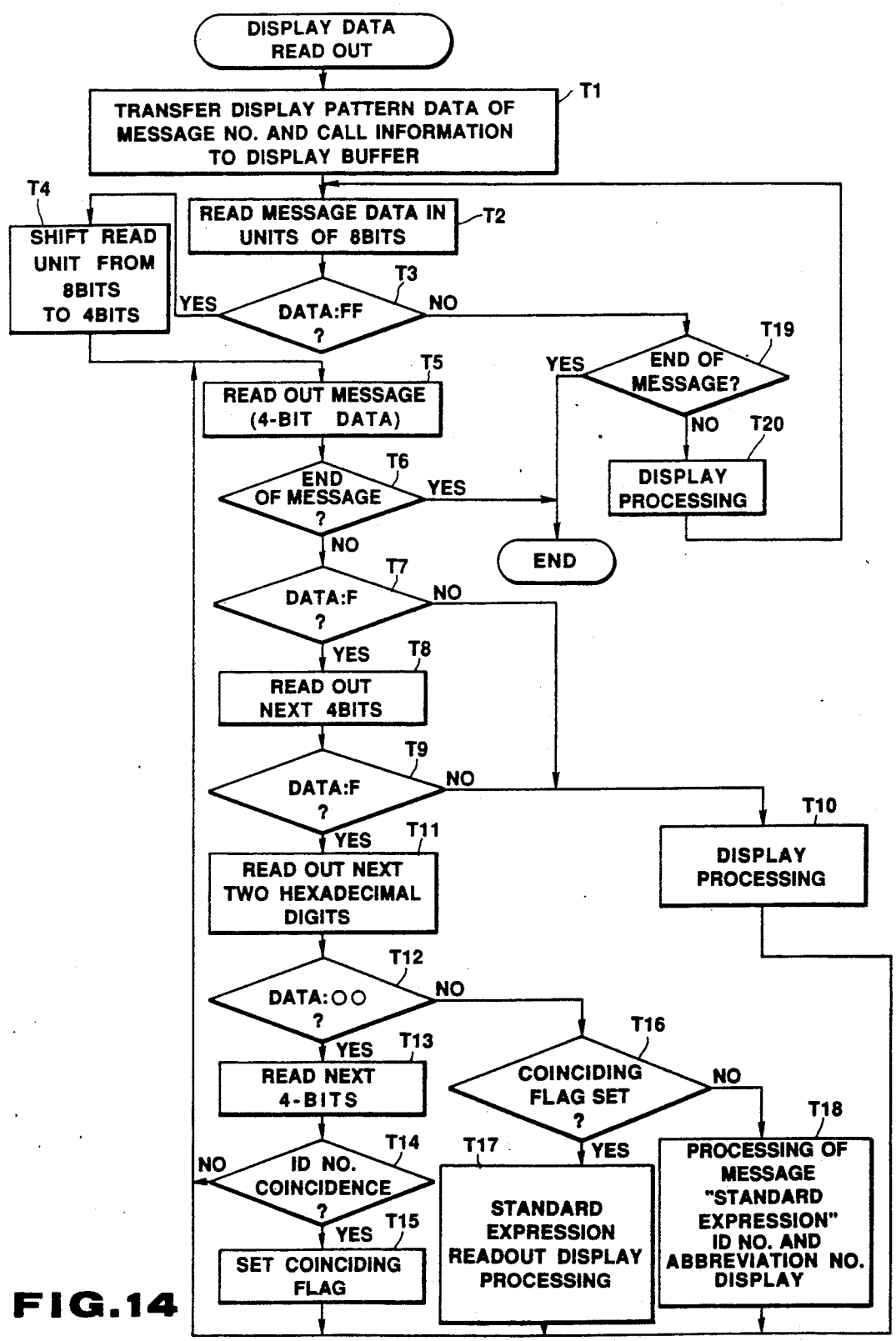
FIG. 14 is a flow chart showing readout processing of the second embodiment.

FIG. 14 is a flow chart showing readout data display processing of the second embodiment.

Upon operation of the forward key 41, the same display pointer operations as in steps S21 to S23, S25, and S26 in FIG. 9 are performed, and the readout data display processing is then executed. In step T1, call information of the message register designated by a display pointer P is read out, and display pattern data corresponding to these codes together with the message No. are read out from a character generator 29. The readout data are stored in a display buffer 30. The message data are read out as the alpha-numeric code in units of eight bits (step T2), and it is determined in step T3 whether the 8-bit data is a shift code "FF" which represents shift from the JIS 8-bit code to the 4-bit numeric code. If YES in step T3, the data analysis or reading unit is shifted to 4 bits in step T4, the subsequent data are read in units of four bits (step T5), and a CPU 25 then determines in step T6 whether the message is ended. If NO in step T6, the flow advances to step T7 to determine whether the readout data is the F (hexadecimal notation) code. If YES in step T7, the flow advances to step T8, and the next 4-bit data is read out to determine in step T9 whether it is an F code. If the data read out for the decision block in step T7 or T9 is not an F code, the readout data represents a symbol or a numeric code. The flow advances to step T10, and the pattern data corresponding to the readout data is read out from the character generator 29. The readout pattern data is transferred to the display buffer 30, and the corresponding symbol or numeric value is displayed on a display 31.

If the readout data is detected as an F code in step T9, i.e., two successive F codes are detected, the next data are determined as significant data in the form of two hexadecimal digits. In this case, the flow advances to step T11, and two hexadecimal digits (i.e., 8 bits) are read out. The CPU 25 determines in step T12 whether the readout data is "00". The code "00" represents the subsequent 4-bit data as an ID number of a standard expression memory. The flow then advances to step T13 to read out the next four-bit data. The CPU 25 determines in step T14 whether the 4-bit numeric code, i.e., the ID number of the standard expression memory from the transmitter coincides with that stored in the standard expression memory pack 46 inserted into the receiver. If YES in step T14, a coincidence flag F is set in step T15, and the flow returns to step T5. In step T5, the message data is read out.

If the code having the two hexadecimal digits read out for the decision block in step T12 is not the code "00", the two-digit code represents the standard message abbreviation number sent next to the code "FF", and the flow advances to step T16. The CPU 25 determines in step T16 whether the coincidence flag F is set. If YES in step T16, standard expression readout display processing in step T17 is executed. In this standard expression readout display processing, the standard expression corresponding to the transmitted abbreviation number is read out from the standard expression memory 32. Character pattern data corresponding to the code is read out from the character generator 29 and transferred to the display buffer 30. Therefore, the standard expression is displayed on the display 31.

When the CPU 25 determines in step T16 that the coincidence flag F is not set, this indicates that the standard expression memory 32 designated by the caller is not mounted in the receiver. In this case, the flow advances to step T18. The designated ID number of standard expression memory, a message "STANDARD EXPRESSION", and the standard expression abbreviation No. are displayed on the display 31.

When the CPU 25 determines in step T3 that the data is not the shift code "FF", the flow advances to step T19 to determine whether the message is ended. If NO in step T19, the flow advances to step T20. The data are analyzed as the 8-bit codes, and the corresponding pattern data are read out from the character generator 29 and transferred to the display buffer 30. The pattern data are then displayed on the display 31. The flow then returns to step T2.

In the second embodiment described above, only the standard expression memory 32 as a ROM is incorporated in the standard expression memory pack 46. However, the standard expression memory 32 may comprise a RAM, and standard expressions formed by a caller may be registered therein.

Alternatively, the standard expression memory may comprise a detachable memory for storing specific standard and a built-in memory (i.e., a memory incorporated in the receiver) for storing general standard expressions. In this case, for example, if a standard expression abbreviation number (number) represents 50 or less, the standard expressions stored in the built-in memory are designated. If the standard expression abbreviation number represents 51 or more, the standard expressions stored in the detachable memory are designated. In this case, a step for determining whether the number represents 51 or more is provided between steps T12 and T16 in the flow chart of FIG. 14. If the number represents 51 or more, the flow advances to step T16. Otherwise, a corresponding standard expression in the built-in memory is read out and displayed.

According to the second embodiment, the standard expression memories for storing standard expressions which satisfy needs of users can be selectively mounted in the receiver, and a message having an arbitrary content can be transmitted depending on the needs of callees.

When a standard expression memory having a number different from the ID number of the standard expression memory designated by the message information transmitted from the transmitter is mounted in the receiver, the ID number of the designated standard expression memory is displayed. Therefore, the callee can easily select a proper standard expression memory.

The receiver need not have a standard expression memory. In this case, the receiver can display only numeral data when a key telephone set is used.

In the above embodiments, the abbreviation numbers are input from a key telephone set. The abbreviation number, however, can be input from, for example, a personal computer.

In the above embodiments, the data input by the key operation is used as the shift code itself. The shift code can be obtained by processing data input by the key operation.

What is claimed is:

1. A paging receiver comprising:
   receiving means for receiving a coded signal which is transmitted from a transmitter of a base station and for demodulating the coded signal, the coded signal including address data and message data;
   memory means for storing the message data demodulated by said receiving means;
   standard expression memory means, detachable from said paging receiver, for storing predetermined standard expressions;
   alpha-numeric display means for displaing a demodulated message data; and
   display control means for reading out said message data from in said memory means and for displaying said message data on said alpha-numeric display means, said display control means including means for detecting a specific code in said message data, means for processing said message data as alpha-numeric code data until said specific code is detected by said detecting means and for processing data following said specific code as numeric code data for identifying a message to be displayed after said detecting means detects said specific code, and means for reading out a stored standard expression from said standard expression memory means by a predetermined number of numeric data following said specific code.

2. A receiver according to claim 1, wherein said standard expression memory means includes a ROM.

3. A receiver according to claim 1, wherein said standard expression memory means includes a RAM.

4. A receiver according to claim 1, further including a second standard expression memory means, built in said receiver, for storing predetermined standard expressions.

5. A receiver according to claim 1, wherein said standard expression memory means includes means for storing a pluraltiy of standard expression messages and an ID number assigned to said standard expression memory means.

6. A receiver according to claim 5, wherein said display control means comprises means for discriminating whether an ID number in the message data is coincident with the ID number assigned to said detachable memory, and means for reading out the standard expression message from said detchable memory on the basis of an abbreviation number in the message data when a coincidence is detected by said discriminating means and for displaying the ID number in the message data and the abbreviation number when a noncoincidence is detected by said discriminating means.

7. A receiver according to claim 5, wherein:
said message data includes an abbreviation number;
said display control means comprises discriminating means for discriminating whether an ID number in said message data is coincident with said ID number assigned to said standard expression memory means; and
said display control means reading out a standard expression message from said standard expression memory means when coincidence is detected by said discriminating means and displays said ID number in message data and said abbreviation number when a noncoincidence is detected by said discriminating means.

8. A receiver according to claim 7, further including a second standard expression memory means, built in said receiver, for storing predetermined standard expressions.

9. A paging receiver comprising:
receiving means for receiving a coded signal which is transmitted from a transmitter of a base statino and for demodulating the coded signal, the coded signal including address data and message data;
memory means for storing the message data demodulated by said receiving means;
standard expression memory means, detachable from said paging receiver, for storing predetermined standard expressions;
alpha-numeric display means for displaing a demodulated message data; and
display control means for reading out said message data stored in said memory means and for displaying said message data on said alpha-numeric display means, said display control means including means for detecting a specific code in said message data, and means for reading out a stored standard expression from said standard expression memory means by a predetermined number of numeric data following the specific code.

10. A receiver according to claim 9, wherein said standard expression memory means includes means for storing a plurality of standard expression messages and an ID number assigned to said standard expression memory means.

11. A receiver according to claim 10, wherein:
said message data includes an abbreviation number;
said display control means comprises discriminating means for discriminating whether an ID number in said message data is coincident with said ID number assigned to said standard expression memory means; and
said display control means read out a stored standard expression from said standard expression memory means when a coincidence is detected by said discriminating means and displays the ID number in said message data and said abbreviation number when a noncoincidence is detected by said discriminating means.

12. A receiver according to claim 9, wherein said standard expression memory means comprises a ROM.

13. A receiver according to claim 9, wherein said standard expression memory means comprises a RAM.

* * * * *